Figure 1:
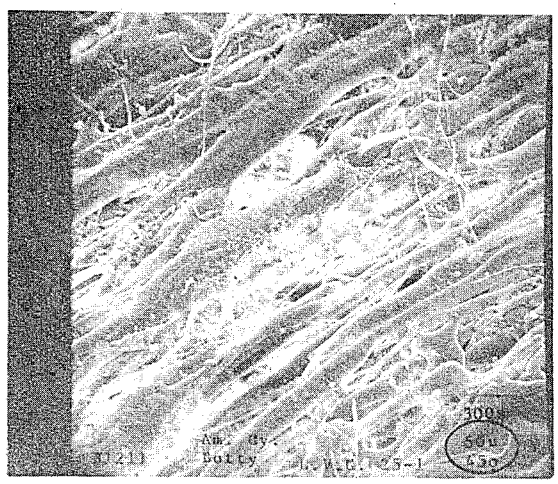

United States Patent

Gallacher

[15] 3,675,391

[45] July 11, 1972

[54] BREATHABLE WATERPROOF FABRIC

[72] Inventor: Lawrence Vincent Gallacher, Norwalk, Conn.

[73] Assignee: American Cyanamid Company, Stamford, Conn.

[22] Filed: March 4, 1971

[21] Appl. No.: 121,094

Related U.S. Application Data

[63] Continuation-in-part of Ser. No. 820,761, May 1, 1969, abandoned.

[52] U.S. Cl. .................................................55/16, 55/524
[51] Int. Cl. ...................................B01d 39/16, B01d 49/00;
[58] Field of Search....................161/159, DIG. 2; 55/16, 36, 55/158, 524, 527, 528

[56] References Cited

UNITED STATES PATENTS

| | | | |
|---|---|---|---|
| 2,933,154 | 4/1960 | Lauterbach | 55/528 X |
| 3,197,946 | 8/1965 | Taylor | 55/528 X |
| 3,262,834 | 7/1966 | Abell et al. | 161/DIG. 2 |
| 3,455,792 | 7/1969 | Masanori Ohta | 55/528 X |

*Primary Examiner*—Reuben Friedman
*Assistant Examiner*—R. W. Burks
*Attorney*—James H. Laughlin, Jr.

[57] ABSTRACT

A breathable-waterproof material is given wherein an extensively fibrillated thermoplastic resin material is formed which permits high water vapor transmission levels while substantially precluding liquid water penetration.

7 Claims, 6 Drawing Figures

INVENTOR
LAWRENCE V. GALLACHER
ATTORNEY

BREATHABLE WATERPROOF FABRIC

This application is a continuation-in-part of my prior application, Ser. No. 820,761, filed May 1, 1969, now abandoned.

This invention relates to a new composite material. More particularly this invention relates to novel breathable-waterproof material or composite which permits high water vapor transmission while retarding liquid water penetration. In particular this invention relates to a method of protecting an environment from water in the liquid phase while permitting the transmission of water in the vapor phase. In one embodiment this invention relates to material which is useful as rainwear.

Conventional fabrics without surface treatments function poorly in applications where water repellency is required. The major reasons for this deficiency are well known: improper surface characteristics permitting wetting, and open construction which facilitates the passage of water through the material. It is a simple matter to correct this by adding a continuous barrier layer to the fabric, as in the case of rubber or vinyl-coated fabrics, and such materials are essentially perfect barriers to liquid water. However, the same materials are barriers to liquid water. However, the same materials are barriers as well to the passage of air and water vapor, and this seriously detracts from the comfort of rainwear based on the fabric. Thus, ideally, rainwear material should be a water barrier and yet be breathable, that is, highly permeable to water-vapor or air.

One approach to the problem is to employ tightly woven fabrics which have been treated with surface finishes to render them non-wettable. Such treatments have not been completely successful because these surface finishes are not permanent and are ineffective against water at significant pressures, such as, for example, in driving rain or sitting on wet clothing. Another approach to the problem has been to coat the fabric with a thin microporous coating. This approach is limited inherently in not being able to impart effective water rejection and breathability simultaneously.

It is an object of this invention to provide a thermoplastic material which is unique in that it functions as a barrier to liquid water while at the same time permitting high air and water vapor transmission.

This and other objects are accomplished by the use of a novel thermoplastic resin which has been processed to a unique fibrillar form. My solution to the problem of combining water rejection and breathability is based on utilizing this unique type of fibrillar form structure or material.

This unique material employed in this invention is formed by the addition of a primary solid particulate thermoplastic resin which is characterized by being insoluble in a selected leaching agent or solvent to a secondary thermoplastic resin which serves as a dispersing matrix and is characterized by being soluble in the selected leaching agent or solvent. It has been surprisingly found that if these resins are mixed and subjected to shearing action at temperatures above or just slightly below the melting point of the primary resin, a continuous fibrillated mat or web-type structure is formed by the primary resin. This fibrillated structure of the primary resin in the secondary resin matrix can then be leached with the selective solvent which removes the secondary resin leaving behind the extensively fibrillated structure. If the material is compressed before leaching, the nature of the fibrillation changes within the structure resulting in enhancement of the permeability.

This material, the extensively fibrillated sheet structure used in this invention may be more precisely characterized as having the form of a continuous or nearly continuous and integral three dimensional network or structure containing interconnected branching ribbons and ligaments, with the principal surfaces of the ribbons arranged parallel to the plane of the sheet. The thickness of the ribbon-like elements ranges from about 0.3 to 20 microns and preferably in the range of 1 to 9 microns. The widths are not as well defined because of extensive lateral branching, but generally they are in the range of about 0.3 to 40 microns and preferably they are from about 2 to 25 microns. In many cases the ribbons and ligaments continue nearly the whole length of the sheet. Generally they are at least 1 inch in length and preferably at least 200 microns. Within the fibrillar structure itself are void areas between the ribbons which are substantially uniformly dispersed throughout the material with major dimensions essentially parallel to the sheet. The density of the sheet ranges from about 0.25 to about 0.6 and preferably from about 0.3 to about 0.5. Average void thickness which is the smallest dimension of the void, is approximately 1 micron with a range from 0 to 25 microns. This structure is essentially the same for all fiber-forming semi-crystalline thermoplastic polymers such as polyolefins, polyesters, polyamides and others when fibrillated according to this invention.

FIGS. 1 through 6 show fibrillated structures at various magnifications and are representative of the types of structure found in this invention. Identically similar structures are achieved when two or more semi-crystalline thermoplastic polymers are fibrillated.

More specifically, a fiber-forming semi-crystalline thermoplastic resin such as, for example, polyethylene, polypropylene, poly(1-butene), poly (4-methyl pentene), poly (glycolic acid), poly (ethylene terephthalate), poly(hexamethylene sebacamide), other polyolefins, polyesters, or polyamides, copolymers containing these polymers or mixtures of these or other semi-crystalline thermoplastic polymers is dispersed in a resin matrix such as, for example, poly(methyl methacrylate), polystyrene, polyisobutylene, poly(vinyl acetate), poly(ethylene oxide) and others, either plasticized or unplasticized, singly or in combination, at a temperature above the melting point of the thermoplastic resin. The secondary resin is conveniently selected on the basis of its solubility in a selected solvent as opposed to the insolubility of the fiber-forming semi-crystalline thermoplastic resin in the same select solvent and the workable temperature of the secondary resin. It is important that the secondary resin be workable at the temperature selected and comparable in melt viscosity to the fiber-forming component at the working temperature. Thus, for example, if polyethylene is selected as the fiber-forming semi-crystalline thermoplastic resin and poly(methyl methacrylate) is selected as the secondary resin forming the resin matrix, the working temperature of the dispersion should be from about 140° to about 250° C. and preferably from about 150° to about 190° C.

Further, the chemical natures of the matrix and fibrillator are important, for the interactions of the two phases at their interface depend upon them. It is for this reason, it is believed, that polystyrene and poly(methyl methacrylate) matrices impart different properties to poly-(1-butene), and polyolefin fibrillar materials are improved when the poly(methyl methacrylate) matrix is modified with poly(ethylene oxide). Surface forces tend to relax the ribbon-like structural elements toward rod-like, round cross-sections in opposition to viscous forces and, therefore, it is desirable to keep viscosities high and surface energy low. Modification of poly(methyl methacrylate) with poly(ethylene oxide) appears to produce low surface energies with polyolefins and a number of other polymers.

Dispersion, mixing, and blending are important and may be accomplished on a twin-screw extruder, two-roll mill or other conventional high shear mixing device. Once the resin blend is uniform and the mixing well advanced, continued shear will cause orientation and fibrillation of the thermoplastic resin. At this point the temperature may be maintained at the original level or may be lowered to increase the orientation and fibrillation. Ordinarily some of this fibrillation takes place in the compounding or mixing operation. After mixing, the resin-matrix mixture may be compressed, extruded, or treated in any other conventional way to achieve shear within the matrix thus causing or enhancing the orientation and fibrillation of the thermoplastic resin.

Subsequently, the prepared resin matrix mixture is treated with an appropriate leaching solvent such as, for example, toluene, acetone, ethylene dichloride, methylene chloride, methyl alcohol, or other appropriately selected solvents which extract, leach, or dissolve the secondary resin or resin matrix thus leaving the fibrillated product. This extraction may be carried out by any conventional manner such as soaking or spraying and may be accelerated by heat, providing, however, that care be taken to maintain the fibrillated structure.

Our solution to this problem of combining water rejection and breathability is based upon utilizing this unique type of structure. Typically, a blend of 9 parts by weight polyolefin, and optionally 1 part by weight polytetrafluoroethylene, and 27 parts by weight of modified poly(methyl methacrylate) matrix is compounded above the melting point of the polyolefin and softening point of the modified poly(methyl methacrylate), and then extruded to form a sheet. This is treated with methylene chloride to extract the soluble matrix, leaving behind a soft sheet of fibrillated polyolefin and polytetrafluoroethylene if added.

Figure 3:
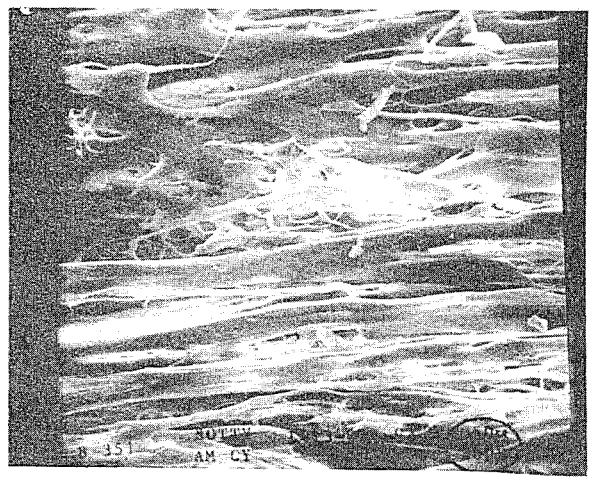

Microscopic examination of the sheet reveals a network of micro-ribbons, ligaments, and fibrils. For example, FIG. 3 is a micrograph of a typical cross-section of a polypropylene sheet which has been sectioned parallel to the flow direction. Here we are looking at the leading edges of the ribbons. In this case which is typical, the width of the ribbons ranges from about 0.3 to 40 microns. However, it can be easily ascertained that the typical ribbons have a width of about 20 microns. In like manner the ribbon thickness ranges from about 0.3 to 20 microns, but it can be easily seen that they typically are about 8 microns. The vertical space between the ribbons averages about 1 to 2 microns and ranges from nearly 0 to 20 microns.

While different materials and process variations may vary these values for ribbon width, thickness, pore size, etc., these are typical and representative generally of the structures found in this invention. Within the scope of this invention are ribbon, fibril, or ligament structures which have a width to thickness ratio from 1:1 to 11:1 although I prefer ranges of from about 3:1 to 8:1.

Figure 2:
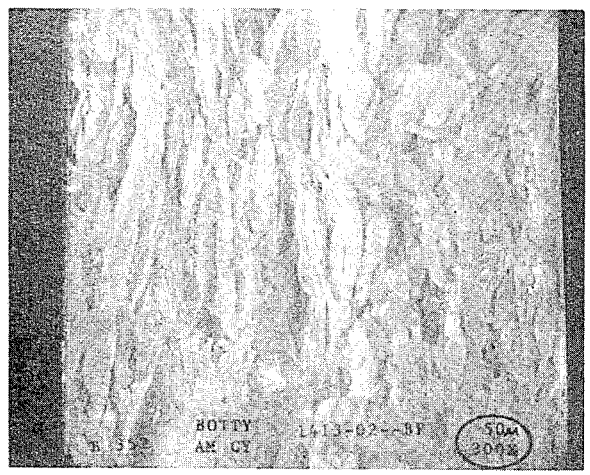

FIG. 2 is a top view of the polypropylene structure and it shows that the lengths of the ribbons are typically greater than the microscopic dimensions. In fact they are usually larger than 1 inch although this can vary greatly depending upon the material system and process. Preferably the length of these structures is at least 200 microns. The network is aligned principally in the flow direction. However, there are many internal connections between fibrils and ribbons so that the extracted sheet is quite coherent and strong.

Figure 5:
Figure 6:
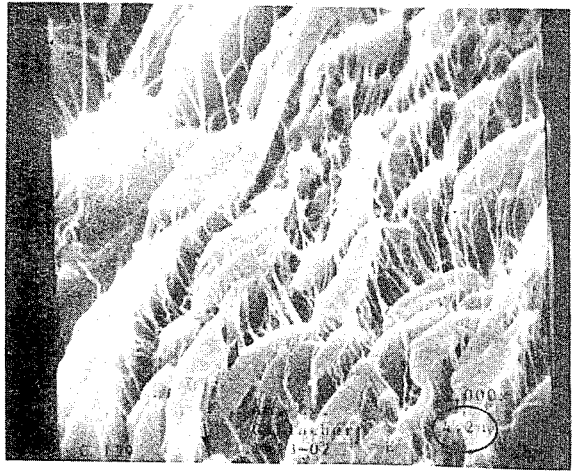

FIGS. 5 and 6 are 1,000× and 3,000× magnifications of a poly(1-butene) system containing 10 percent polytetrafluoroethylene. FIG. 5 is a side edge view at 1,000× magnification. At this level most of the apparent structural features consist of polyolefin micro-ribbons and filaments. FIG. 6 at the higher magnification reveals the polytetrafluoroethylene structure which has the form of a three-dimensional network of very fine fibrils. This polytetrafluoroethylene sub-structure consists of fibrils which generally connect and penetrate the polyolefin ribbons. There is a great deal of entanglement, and the fibrils range from less than 0.02 microns to 0.2 microns in diameter with inter fiber spacings ranging from about 0 to 3 microns. The polytetrafluoroethylene sub-structure contributes much to the overall physical strength of the sheet.

Figure 4:

FIG. 1 is a 300× magnification of low density polyethylene while FIG. 4 is a 1,000× magnification of poly (glycolic acid). The consistency of the general structures of this invention are easily seen.

The structure described here is not only ideally suited for the task of rejecting liquid water, but for permitting the passage of water vapor and air. Movement of gases through solid media generally occurs via the classical permeation route of solution/diffusion or by gaseous diffusion through continuous pores or openings. The latter mechanism is much faster for transport of gases through all but sub-micron films, and is the mechanism of choice here. Thus it has been found that the fibrillated sheets of this invention have very high water-vapor transmissions, with values comparable to conventional woven fabrics. Air also passes quickly through the material at low pressure. It is evident that gases pass through this material by following continuous open paths. This same structure appears to block the passage of liquid water.

While I do not wish to be bound by any theoretical explanation I believe this invention is made possible by a combination of size and surface force effects. The wetting of solid surfaces by liquids is a function of the surface tension of each phase ($\gamma_{Liquid}$ and $\gamma_{Solid}$) and the interfacial tension ($\gamma_{LS}$). These parameters determine the contact angle $\theta$, which is the angle formed by a drop of the liquid on the surface. The relationship between $\theta$ and the surface tensions is given by the Young equation:

$$\gamma_{Solid} = \gamma_{LS} + \gamma_{Liquid} \cos \theta$$

If $\theta$ is less than 90°, the liquid tends to advance on the surface to achieve an equilibrium value of $\theta$, while if $\theta$ exceeds 90°, the liquid tends not to spread. When $\theta$ reaches 180°, no wetting occurs. If $\theta$ is greater than 90° and the solid is porous, a critical pressure on the liquid must be exceeded before it will penetrate the pores. This pressure is given by the Washburn equation, $$P = (-2 \gamma \cos \theta)/r$$

where $P$ is the pressure, $\gamma$ the surface tension of the liquid, and $r$ the radius of the pore being penetrated. It is believed this expression can be applied to the unique fibrillated structures described herein with $2r$ taken as the smallest dimension of the free-space or voids between the ribbons. If the pressure does not reach the critical value as defined by the equation given above, penetration will not occur. Taking this as an equilibrium effect, the thickness of the fibrillated structure or sheet should not matter and the only important consideration is the smallest gap the liquid must pass through in each continuous path through the sheet. Of course, in any situation where there are only a few gaps involved per path, the probability of encountering a small limiting gap will increase with thickness. Further, since the paths are necessarily quite long compared to the thickness of the sheet because of the ribbon dimensions, there will be appreciable kinetic effects retarding movement of the liquid through the sheet even when the critical pressure is exceeded. Finally, the application of force normal to the surface of the material will compress it and thereby tend to decrease the widths of the internal spacings, which are generally aligned parallel to the surfaces.

For liquid water repellency, a material which forms contact angles of 90° or greater with water is needed. Polyolefins including polyethylene, poly(1-butene) and others, and polytetrafluoroethylene are such materials. Further, there is a hysteresis effect which leads to contact angles for advancing liquid fronts larger than those for receding liquids. Approximate advancing contact angles with water and openings penetrated at one atmosphere of pressure are given below.

| | Water/Polymer Advancing Contact Angle | Minimum Opening Penetrated at 1 atmosphere |
|---|---|---|
| Polyethylene | 99° | .45 microns |
| Polypropylene | 106° | .80 microns |
| Polytetrafluoroethylene | 112° | 1.08 microns |

It can be seen from the table that polyethylene/polytetrafluoroethylene combinations should perform very well as liquid water barriers, as indeed they do. Further, one can deduce that for service at lower hydrostatic pressures, polyolefins should function adequately without polytetrafluoroethylene. Similarly, polytetrafluoroethylene can be used by itself in certain instances, or can be used in conjunction with other polymers with smaller contact angles to up-grade their water repellent characteristics. These include polyesters, polyamides, and mixtures of the same.

Thus it is easily seen that this novel fibrillated material may be used to protect environments from any type of liquid penetration when the liquid forms a contact angle with the material of about 90° or greater. At the same time gas transmission in either direction will in many cases not be effected.

While we have discussed some specific materials, any high molecular weight, fiber forming semi-crystalline thermoplastic polymer is effective in the invention. The unique product of this invention is particularly effective in protecting against liquid water penetration. Thus this material is very satisfactory for rain and other foul weather wear. When used, for example, as rainwear, it protects the user from liquid water and at the same time the natural moisture of the user is allowed to escape thus increasing the wearer's personal comfort. Because the unique material employed is soft and flexible, it is particularly useful in clothing applications such as, for example, coats, gloves and the like. It may likewise be used in outdoor tenting and other applications where it is desired to have vapor transmission in either direction while at the same time precluding liquid water penetration. The material may be used in gas-liquid membrane systems and in any variety of other ways where it is desired to protect any environment from liquid penetration while permitting gas to freely pass.

The following examples embody particular modes of this invention but are not intended to limit the invention except as appears appended from the claims. All parts are by weight unless otherwise stated.

EXAMPLE 1

Sixty parts by weight of molding grade poly(methyl methacrylate) pellets, 20 parts of powdered high molecular weight poly(ethylene oxide), 27 parts of isotactic poly(1-butene) pellets, and 3 parts of poly-(tetrafluoroethylene) in aqueous dispersion form were combined in a ribbon blender at room temperature. The resulting mixture was charged to a twin-screw extruder and melt compounded at about 200° C. The product was extruded to form a continuous sheet 10 mils thick. The sheet was cut into 12 inch squares which were then immersed in methylene chloride at room temperature to extract substantially all (99 percent+) of the poly(methyl methacrylate) and poly(ethylene oxide) within 3 hours. The resulting product was a sheet structure of microporous fibrillar poly (1-butene) and poly(tetrafluoroethylene) and was quite soft and esthetically pleasing.

These sheets were tested by the Hydrostatic Pressure Method according to Federal Test Method Standard No. 191, Method 5512 (Dec. 31 1968) to determine the resistance of the material to the passage of water under pressure. Essentially the specimen was placed between two annular plane clamping surfaces and hydraulic pressure was applied to the underside of the clamped surface by means of a piston. At the first appearance of water through the specimen, the pressure was recorded.

Water vapor transmission was determined by the standard ASTME–96, Procedure B.

The results of these tests are shown below.

|  | Water Resistance | Water Vapor Transmission |
|---|---|---|
| Example 1 | 16 psi | 1100 gms/m²–24 hours |

EXAMPLE 2

Example 1 was repeated substituting low density polyethylene for the poly(1-butene). The resulting product gave results which were very similar to the results of Example 1.

EXAMPLE 3

The liquid water penetration under pressure was determined for a number of materials and materials composites including the materials of this invention. The test was conducted by employing glass syringes having bore areas of 0.31 square inches or 0.44 square inches. Each syringe was filled with water and placed with the base flat on top of the material to be tested and underneath was a piece of blotting paper. Various weights were placed on the plunger of the syringe in order to establish a force per unit area and observations were made as to whether the water penetrated the fabric and it was determined whether the paper was wetted or not.

The following materials were tested:

A. Commercial water repellent polyester/cotton rainwear fabric

B Woven polyester cotton fabric with a microporous coating of polyurethane (Reevair)

C. Supported Vinyl fabric (Naugahyde)

D Fibrillated polyethylene

E Fibrillated polyethylene with 10 percent polytetrafluoroethylene

F. Fibrillated poly(1-butene) with 10 percent polytetrafluoroethylene

The same water vapor transmission test employed in Example 1 was employed. In addition, air transmission measurements were made using Federal Test Method Standard No. 191, Method 5452. The results of these tests were recorded in Table I.

TABLE I

| Material | Water resistance (psi) | Water vapor transmission (gms/m²/24 hrs) | Air transmission seconds/100 cc |
|---|---|---|---|
| A | <0.7 | >800 | 1 |
| B | <2.5 | >400 | 45 |
| C | >14.4 | <100 | >10,000 |
| D | >14.4 | >800 | 6 |
| E | >14.4 | >800 | 20 |
| F | >14.4 | >800 | 140 |

I claim:

1. A method of protecting an environment from water in the liquid phase while permitting the transmission of gases selected from the group consisting of water vapor and air comprising interposing between the environment to be protected and the source of water in the liquid phase a semi-crystalline thermoplastic high molecular weight polymer having a web structure of the form of a continuous and integral three-dimensional network of interconnected ribbons and ligaments, said ribbons and ligaments being oriented uniaxially and having widths ranging from about 0.3 to about 40 microns, thicknesses ranging from about 0.3 to about 20 microns, lengths of at least 200 microns, and having void areas substantially uniformly dispersed throughout the material with major dimensions essentially parallel to the plane of the sheet, said voids being ribbon-like in form and having apparent thickness of less than about 25 microns.

2. The method according to claim 1 wherein the polymer is a fiber forming polyolefin.

3. The method according to claim 2 wherein the polymer is selected from a group consisting of polyethylene, isotactic polypropylene, isotactic poly(1-butene), and isotactic poly (4-methyl pentene).

4. The method according to claim 1 wherein the semi-crystalline thermoplastic high molecular weight polymer is selected from the group consisting of polyolefins, polyesters, polyamides, and mixtures of the same, and is admixed with polytetrafluoroethylene.

5. The method according to claim 4 wherein the polymer is selected from the group consisting of polyethylene, isotactic polypropylene, isotactic poly(1-butene), isotactic poly (4-methyl pentene), poly(glycolic acid), poly(ethylene terephthalate), the polyamide of 12 12-aminododecanoic acid, and poly(hexamethylene sebac amide) and mixtures of the same.

6. The method according to claim 1 wherein the semi-crystalline thermoplastic high molecular weight polymer comprises a network of ribbons and ligaments wherein the ribbon width to thickness is in a ratio from about 1 to 1 to about 11 to 1.

7. The method according to claim 1 wherein the ribbon width to thickness is in a ratio of from about 3 to 1 to about 8 to 1.

* * * * *